United States Patent Office 2,881,095
Patented Apr. 7, 1959

2,881,095
SOIL-RESISTANT RESILIENT TILE AND METHOD OF MAKING THE SAME

Paul V. McKinney, Princeton, N.J., assignor to Armstrong Cork Company, Lancaster, Pa., a corporation of Pennsylvania No Drawing. Application April 15, 1957
Serial No. 652,648

19 Claims. (Cl. 117—118)

This invention relates to a soil-resistant tile and method of making the same. Some resilient flooring tiles are produced from a composition which includes a plasticized resinous binder system, fillers, and pigments. One of the commonly used plasticizers for the resinous components of the binder system is an oil gel or pitch, such as gelled tall oil. Vegetable oil pitches are also used as plasticizers, either alone or in admixture with other plasticizer components, principally mineral oil. Generally, a mixed plasticizer is used to obtain a desirable combination of physical properties in the finished tile.

These oil gel or pitch plasticizers which have as their base a drying or semidrying oil, that is a glyceride siccative oil, contain unsaturated carbon-to-carbon double bonds and are subject to gradual oxidation when exposed to the atmosphere at normal room temperatures. It has been determined that this gradual oxidation of the oil component which takes place slowly over a long period of time produces adverse factors in the finished product, principally a tendency of the tile to curl slightly at the edges. This reduces the so-called shelf life of the tile and necessitates that the tile be installed and adhesively secured in position before the tile has aged to the extent that curling is objectionable. Curling results in slight cupping of the abutting edges of the tiles, presenting an unsightly appearance.

To minimize this oxidation of the siccative oil plasticizer, and the resin to a lesser degree, antioxidants are incorporated into the tile composition to protect the binder system against oxidation. The incorporation of these antioxidants protects the tile against aging for at least about a year, adequately extending the shelf life of the tile.

It has been found, however, that the use of these antioxidants sometimes results in undesirable soiling characteristics in the finished tile, for the oil is an incompatible phase in the binder system, and its presence on the surface of the tile is the chief cause of excessive soiling of the product, particularly when it is first installed.

An object of this invention, therefore, is to obtain the benefits which are derived from the incorporation of an antioxidant for the siccative oil plasticizer in tile compositions but to overcome the objectionable tendency of the tiles so produced to soil excessively.

Another object of the invention is to provide a method by which tile containing a siccative oil plasticizer and a protecting antioxidant may be treated to minimize the undesirable tendency of the tile to soil readily.

The following example is a typical formulation for a light-colored resilient tile including a resinous binder system incorporating a siccative oil gel plasticizer and an antioxidant for the plasticizer:

Example I

| | Parts by weight |
|---|---|
| Coumarone-indene resin | 70 |
| Gelled tall oil plasticizer | 20 |
| Mineral oil plasticizer | 10 |
| Antioxidant (hydroquinone) | 0.05 |
| Filler and pigment | 250 |

The tile produced from the composition of this example is adequately protected against undesirable shelf aging, has no substantial tendency to curl in storage, but does have a tendency to soil to an undesirable degree particularly when initially installed.

According to this invention, a formed resilient tile composition having a binder which includes an oxidizable glyceride siccative oil plasticizer in gel or pitch form, protected with an antioxidant, is treated on its exposed wearing surface with a solution of a chemical oxidizing agent which is effective for oxidizing the outer skin surface only of the composition, particularly the oil plasticizer at its carbon-to-carbon double bonds. As mentioned previously, the oil plasticizer is an incompatible phase (to some degree at least) in the binder system and, therefore, is present at the surface of the finished tile. Surprisingly, this oxidizing surface treatment does not adversely affect the desirable properties imparted to the tile by the incorporation of the antioxidant. The thin skin of oxidized material on the surface does not tend to curl the tile during storage prior to installation or objectionably increase the hardness of the tile as a whole or decrease to any measurable extent the flexibility and resiliency of the tile. The improvement in soil resistance, on the other hand, is marked.

The oxidation of the wearing surface may be effected by applying the oxidizing agent to the surface of the product in an aqueous solution form. It is preferred, for reasons of convenience and economy, to treat formed sheets of the composition prior to punching the sheets into tiles, but the tiles may be treated either before or after installation, if desired.

The following examples are illustrative of methods of treatment which may be used:

Example II

Tiles (or sheets or other formed pieces) made from the composition of Example I, after shelf aging for a few days, are treated by swabbing the upper surface of the tiles with a 3% aqueous solution of hydrogen peroxide. The tiles are permitted to dry in open air and, when dry, are ready for use but may be stored in a dealer's warehouse, for example, for long periods of time without deleterious results from oxidation of the siccative oil plasticizer at the surface, the antioxidant protecting the entire body of the tile from oxidation below such skin surface.

Example III

Tiles made from a composition including a siccative oil gel or pitch plasticizer for a resinous component of the binder system and having incorporated therein an antioxidant for the oil plasticizer are swabbed with a 5.25% aqueous solution of sodium hypochlorite. The tiles treated are permitted to dry in open air. They are then ready for immediate use or may be stored for subsequent use.

Example IV

Sheets the same as in Examples II and III are similarly treated with the solutions of oxidizing agents; but instead of applying the treating solutions to the sheets at room temperature, the sheets are at an elevated temperature, above 90° F., say 175° F., at the time of treatment. In conventional practice in tile manufacture, the sheets will be at an elevated temperature as they are delivered for severance into tiles, and the treating solution conveniently may be applied before severance. It is desirable for economical production to treat the formed sheets from which the tiles are to be severed since generally larger sized units, such as the sheets, may be treated more economically than the smaller individual tiles. The latent heat in the sheets serves to facilitate drying and may have some desirable effect on the oxidation of the siccative oil plasticizer at the surface of the product.

While it is preferred to treat the sheets or tiles at the place of manufacture, the method may be practiced by hand at the place of installation, preferably by treating the surface of the tiles after they have been installed on the floor, wall, or other surface. Obviously, the oxidizing agent should be applied directly to the surface of the tiles so as to be brought into contact with the oxidizable oil plasticizer at the surface so that the oxygen liberated from the oxidizing agent may combine with the oil at its carbon-to-carbon double bonds in the oxidizing reaction. That is, the tiles should not be waxed or otherwise treated before application of the oxidizing agent if such treatment will prevent proper oxidation of the oil at the surface. If the tiles have been so waxed, the wax should be removed before treatment with the oxidizing agent. Otherwise, the oxidizing agent will be deposited on the wax and will not function in its intended manner. Consequently, when the initial film of wax is worn away, the oil plasticizer at the surface will tend to render the surface of the tiles more susceptible to ready soiling than tiles properly treated.

There are many resins used in resilient tile manufacture, and the present invention is applicable to all of them where they are plasticized with a siccative oil, regardless of the type or kind or quantity of such plasticizer used. Some of the more extensively used resins are listed below:

Coumarone indene resin (the most commonly used resin)
Polystyrene resin
Petroleum resins generally While the preferred siccative oil plasticizer is gelled tall oil, as mentioned in Example I, because of its low cost, ready availability, and excellent plasticizing effect, other oils or mixtures of them may be used, either in gel form or in the form of pitches, such as:

Tall oil
Menhaden oil
China-wood oil
Cottonseed oil
Linseed oil
Soya bean oil
Glyceride siccative oils generally As noted above, these oils contain unsaturated carbon-to-carbon double bonds.

Many different antioxidants are useful to internally protect the siccative oil plasticizer from oxidation. Compounds recognized as useful for this purpose are:

Phenyl-beta-naphthylamine
Catechol
Hydroquinone
1,3 dihydroxybenzene
1,3,5 trihydroxybenzene
N,N'-diphenyl-p-phenylenediamine
2,5 di-tert-amyl hydroquinone
2,6 di-tert-butyl-4 methylphenol The nature of the binder system, the proportioning of the binder, filler, and color components, the particular resin or resins used in the binder system, the method of fabrication of the tiles, and other factors which are well-recognized in this art, are not critical and do not have any effect on the present invention. The invention is applicable to all compositions which include a glyceride siccative oil plasticizer component of any sort and in any proportion, which is compounded with an antioxidant which serves as an internal protection against oxidation of the plasticizer and also the resin, if it be subject to oxidation.

Hydrogen peroxide and sodium hypochlorite (oxygen-liberating oxidizing agents) have been given above as suitable oxidizing agents in the specific examples. Obviously, other oxidizing agents may be used alone or in admixture. The following additional agents are listed as typical; the invention is not limited to the agents mentioned, for there are a great many oxidizing agents from which to select:

Sodium dichromate
Potassium permanganate
Sodium perborate
Chemical oxidizing agents generally For light-colored tiles, it will not be desirable to use the dichromate or permanganate solutions because of possible discoloration of the surface of the tile. This will not be a factor of consequence in dark-colored tile compositions. So far as oxidation and production of a soil-resistant surface are concerned, however, any chemical oxidizing agent may be used. Obviously, agents which deleteriously affect the resin, filler, or pigment components of the tile will not be selected. There is such a wide range of suitable oxidizing agents available that it is merely a matter of selection of the desired one or a mixture of two or more, bearing in mind the composition of the tiles, their color, and other factors of significance which are recognized by those skilled in the art.

The concentration of the treating solution, the nature of the solvent, the manner of application, and the quantity applied are all matters of choice and are not critical to the success of the invention which is not concerned with proportions, concentrations, or the like. It is preferred to use aqueous solutions, for they are most conveniently handled, are inexpensive, and do not deleteriously affect the tile binder, as would certain petroleum solvents, for example. Those skilled in this art will have no difficulty in determining these factors and will not use insignificant proportions or follow uneconomical or impractical practices.

I claim:

1. In a method of improving the soil resistance of a formed piece of resilient tile including a glyceride siccative oil containing unsaturated carbon-to-carbon double bonds and including an antioxidant protecting said glyceride siccative oil against oxidation at said unsaturated carbon-to-carbon double bonds, the improvement which comprises chemically oxidizing the antioxidant-protected glyceride siccative oil preferentially at the outer skin surface only of said formed piece while maintaining the glyceride siccative oil plasticizer in the interior of the body of said formed piece protected against oxidation by said antioxidant by applying to the outer skin surface of the formed piece an aqueous solution of an oxygen-liberating oxidizing agent to combine the liberated oxygen with said glyceride siccative oil at said carbon-to-carbon double bonds.

2. The method of claim 1 in which the oxidizing agent is selected from the group consisting of hydrogen peroxide, sodium hypochlorite, sodium dichromate, potassium permanganate, sodium perborate, and mixtures thereof.

3. The method of claim 1 in which the solution is applied to the formed piece with the piece at a temperature above 90° F.

4. The method of claim 1 in which the treating agent comprises an aqueous solution of hydrogen peroxide.

5. The method of claim 1 in which the oxidizing agent comprises an aqueous solution of sodium hypochlorite.

6. The method of claim 1 in which the oxidizing agent comprises an aqueous solution of sodium dichromate.

7. The method of claim 1 in which the oxidizing agent comprises an aqueous solution of potassium permanganate.

8. The method of claim 1 in which the oxidizing agent comprises an aqueous solution of sodium perborate.

9. In a method of improving the soil resistance of a formed piece of resilient tile composition having a binder system which includes a glyceride siccative oil containing unsaturated carbon-to-carbon double bonds as a plasticizer in at least a partially incompatible phase in the binder system and which includes an antioxidant incorporated into said binder system and internally protecting said siccative oil plasticizer against oxidation, the improvement which comprises applying to the outer skin surface of said formed piece heated to a temperature above 90° F. a 3% aqueous solution of hydrogen peroxide to chemically oxidize the antioxidant-protected siccative oil plasticizer preferentially at the outer skin surface while maintaining the siccative oil plasticizer in the interior of the formed piece protected against oxidation by said antioxidant.

10. In a method of improving the soil resistance of a formed piece of resilient tile composition having a binder system which includes a glyceride siccative oil containing unsaturated carbon-to-carbon double bonds as a plasticizer in at least a partially incompatible phase in the binder system and which includes an antioxidant incorporated into said binder system and internally protecting said siccative oil plasticizer against oxidation, the improvement which comprises applying to the outer skin surface of said formed piece a solution of an oxygen-liberating oxidizing agent to chemically oxidize preferentially said siccative oil plasticizer present at the outer skin surface of said formed piece as an incompatible phase of the binder system and thereby improve the soil resistance of the formed piece.

11. A formed piece of resilient tile composition having improved soil resistance comprising a glyceride siccative oil containing unsaturated carbon-to-carbon double bonds and an antioxidant internally protecting said glyceride siccative oil against oxidation, the outer skin surface only of said formed piece comprising the oxidation reaction product of said antioxidant-protected siccative oil and a solution of an oxygen-liberating oxidizing agent, in which oxygen liberated from said agent is combined with said glyceride siccative oil at said carbon-to-carbon double bonds.

12. A formed piece of resilient tile composition in accordance with claim 11 in which the outer skin surface comprises the reaction product of said antioxidant-protected siccative oil plasticizer and an aqueous solution of said oxygen-liberating oxidizing agent.

13. A formed piece of resilient tile composition in accordance with claim 12 in which the outer skin surface comprises the reaction product of said antioxidant-protected siccative oil plasticizer and a chemical oxidizing agent selected from the group consisting of hydrogen peroxide, sodium hypochlorite, sodium dichromate, potassium permanganate, sodium perborate, and mixtures thereof.

14. A formed piece of resilient tile composition in accordance with claim 13 in which the outer skin surface comprises the reaction product of the antioxidant-protected siccative oil plasticizer and an aqueous solution of hydrogen peroxide.

15. A formed piece of resilient tile composition in accordance with claim 13 in which the outer skin surface comprises the reaction product of the antioxidant-protected siccative oil plasticizer and an aqueous solution of sodium hypochlorite.

16. A formed piece of resilient tile composition in accordance with claim 13 in which the outer skin surface comprises the reaction product of the antioxidant-protected siccative oil plasticizer and an aqueous solution of sodium dichromate.

17. A formed piece of resilient tile composition in accordance with claim 13 in which the outer skin surface comprises the reaction product of the antioxidant-protected siccative oil plasticizer and an aqueous solution of potassium permanganate.

18. A formed piece of resilient tile composition in accordance with claim 13 in which the outer skin surface comprises the reaction product of the antioxidant-protected siccative oil plasticizer and an aqueous solution of sodium perborate.

19. A formed piece of resilient tile composition having improved soil resistance comprising a binder system which includes a glyceride siccative oil containing unsaturated carbon-to-carbon double bonds as a plasticizer in at least a partially incompatible phase in the binder system and which includes an antioxidant incorporated into said binder system and internally protecting said siccative oil plasticizer against oxidation, the outer skin surface only of said formed piece comprising the heat reaction product of said antioxidant-protected siccative oil plasticizer and a 3% aqueous solution of hydrogen peroxide.

References Cited in the file of this patent
UNITED STATES PATENTS

| | | |
|---|---|---|
| 1,985,200 | Bonney et al. | Dec. 18, 1934 |
| 2,224,237 | Spitzli et al. | Dec. 10, 1940 |
| 2,434,974 | Woerner | Jan. 27, 1948 |